United States Patent
Sielagoski et al.

(10) Patent No.: US 6,275,764 B1
(45) Date of Patent: Aug. 14, 2001

(54) METHOD AND SYSTEM FOR PROVIDING A HEADWAY FUNCTION TO AN ADAPTIVE SPEED CONTROL ACTIVATION SWITCH

(75) Inventors: Gerald L. Sielagoski, St. Clair Shores; Mark Peter Friedrich, Clinton Township; Sam G. Rahaim, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,861

(22) Filed: Dec. 22, 1999

(51) Int. Cl.$^7$ .................................................. B60K 31/00
(52) U.S. Cl. ............................ 701/93; 701/96; 180/170
(58) Field of Search ................................... 701/93, 91, 89, 701/79, 96, 301; 180/170; 340/425.5, 436, 438

(56) References Cited

U.S. PATENT DOCUMENTS

| | | | |
|---|---|---|---|
| 5,594,645 | * | 1/1997 | Nishimura et al. ............ 364/426.044 |
| 5,689,422 | * | 11/1997 | Heymann et al. ...................... 701/93 |
| 5,695,020 | * | 12/1997 | Nishimura ............................. 180/169 |
| 5,708,584 | * | 1/1998 | Doi et al. ................................ 701/96 |
| 5,749,426 | * | 5/1998 | Gilling ................................... 180/167 |
| 5,771,007 | * | 6/1998 | Arai et al. .............................. 340/903 |
| 5,839,534 | * | 11/1998 | Chakraborty et al. ............... 180/169 |
| 5,901,806 | * | 5/1999 | Takahashi ............................. 180/170 |
| 5,934,399 | * | 8/1999 | Iiboshi et al. ......................... 180/169 |
| 6,081,762 | * | 6/2000 | Richardson et al. ................... 701/93 |
| 6,081,763 | * | 6/2000 | Smith et al. ............................ 701/93 |
| 6,116,369 | * | 9/2000 | King et al. ............................ 180/169 |

\* cited by examiner

Primary Examiner—William A. Cuchlinski, Jr.
Assistant Examiner—Olga Hernandez
(74) Attorney, Agent, or Firm—Larry I. Shelton

(57) ABSTRACT

In an adaptive speed control system for a vehicle, a method and system are disclosed for providing a headway function to an adaptive speed control activation switch. The method includes determining whether the adaptive speed control activation switch has been actuated, and, if the adaptive speed control activation switch has been actuated, determining whether the adaptive speed control system is active. The method also includes, if the adaptive speed control system is active, controlling a headway function of the adaptive speed control system in response to the actuation of the adaptive speed control activation switch. The system includes a receiver capable of receiving an input signal indicative of the actuation of the adaptive speed control activation switch, and a controller capable of determining whether the adaptive speed control system is active if the adaptive speed control activation switch has been actuated. The controller is also capable of controlling a headway function of the adaptive speed control system in response to the actuation of the adaptive speed control activation switch if the adaptive speed control system is active.

10 Claims, 2 Drawing Sheets

METHOD AND SYSTEM FOR PROVIDING A HEADWAY FUNCTION TO AN ADAPTIVE SPEED CONTROL ACTIVATION SWITCH

TECHNICAL FIELD

This invention relates to a method and system for providing a headway function to an activation switch for an adaptive speed control system for a vehicle.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path path vehicle. Using the range and range rate, the speed of the ACC equipped vehicle is controlled to maintain a selected following interval between the ACC equipped vehicle and the sensed in-path vehicle. The following interval, also referred to a headway, is set at a default value upon activation of such ACC methods and systems, and is modifiable by the vehicle operator within a predefined range of values. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

Thus, existing ACC methods and systems must provide the vehicle operator with not only the ability to activate the vehicle ACC system, but to select a following interval as well. To do so, however, existing ACC methods and systems employ two vehicle operator switches, one for activating the ACC system and another for adjusting a headway setting. Moreover, in a vehicle equipped with a standard speed control systems, when an ACC system is added to the vehicle, an additional vehicle operator switch must be provided for adjusting a headway setting.

As a result, there exists a need, in an ACC system for a vehicle, for a method and system for providing a headway function to the ACC system activation switch. Such a method and system would determine whether the adaptive speed control activation switch has been actuated, and, if so, determine whether the adaptive speed control system is already active. If the adaptive speed control system is active, such a method and system would then control a headway function of the adaptive speed control system in response to the actuation of the adaptive speed control activation switch. Such control would include adjusting the headway setting of the adaptive speed control system. By providing an adaptive speed control activation switch with such dual capability, such a method and system would eliminate the need for two separate vehicle operator switches, thereby reducing cost.

DISCLOSURE OF INVENTION

Accordingly, it is a principal object of the present invention to provide, in an adaptive speed control system, a method and system for providing a headway function to an adaptive speed control activation switch.

According to the present invention, then, a method is provided, in an adaptive speed control system for a vehicle, for providing a headway function to an adaptive speed control activation switch. The method comprises determining whether the adaptive speed control activation switch has been actuated, and, if the adaptive speed control activation switch has been actuated, determining whether the adaptive speed control system is active. The method further comprises, if the adaptive speed control system is active, controlling a headway function of the adaptive speed control system in response to the actuation of the adaptive speed control activation switch.

A system is also provided according to the present invention, in an adaptive speed control system for a vehicle, for providing a headway function to an adaptive speed control activation switch. The system comprises a receiver capable of receiving a signal indicative of actuation of the adaptive speed control activation switch, and a controller capable of determining whether the adaptive speed control system is active if the adaptive speed control activation switch has been actuated. The controller of the system of the present invention is also capable of controlling a headway function of the adaptive speed control system in response to the actuation of the adaptive speed control activation switch if the adaptive speed control system is active.

These and other objects, features and advantages of the present invention will be readily apparent upon consideration of the following detailed description of the invention in conjunction with the accompanying drawings.

BEST MODE FOR CARRYING OUT THE INVENTION

Figure 1:
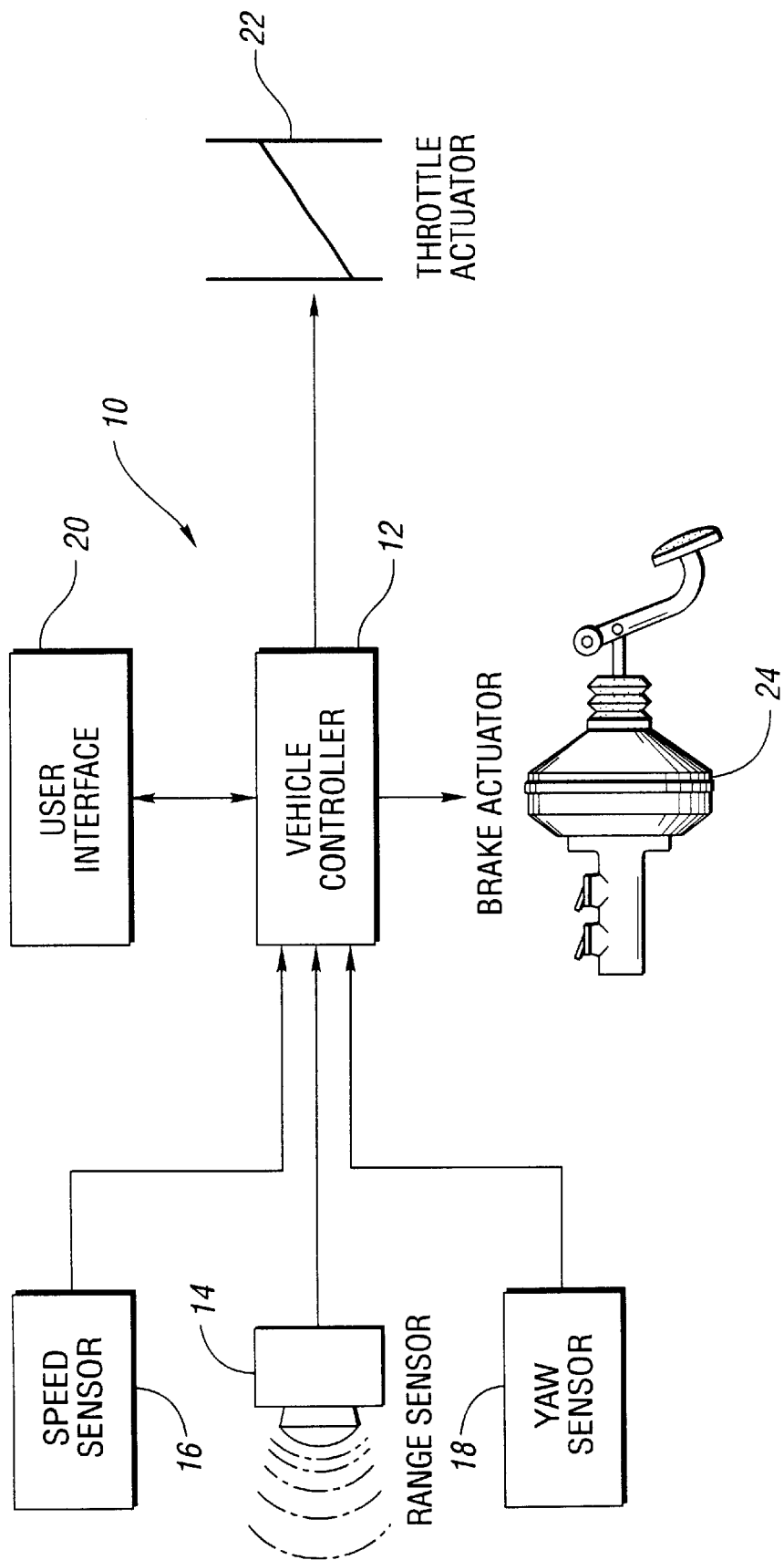
FIG. 1 is a simplified block diagram of an adaptive cruise control system, including the system of the present invention.
Figure 2:
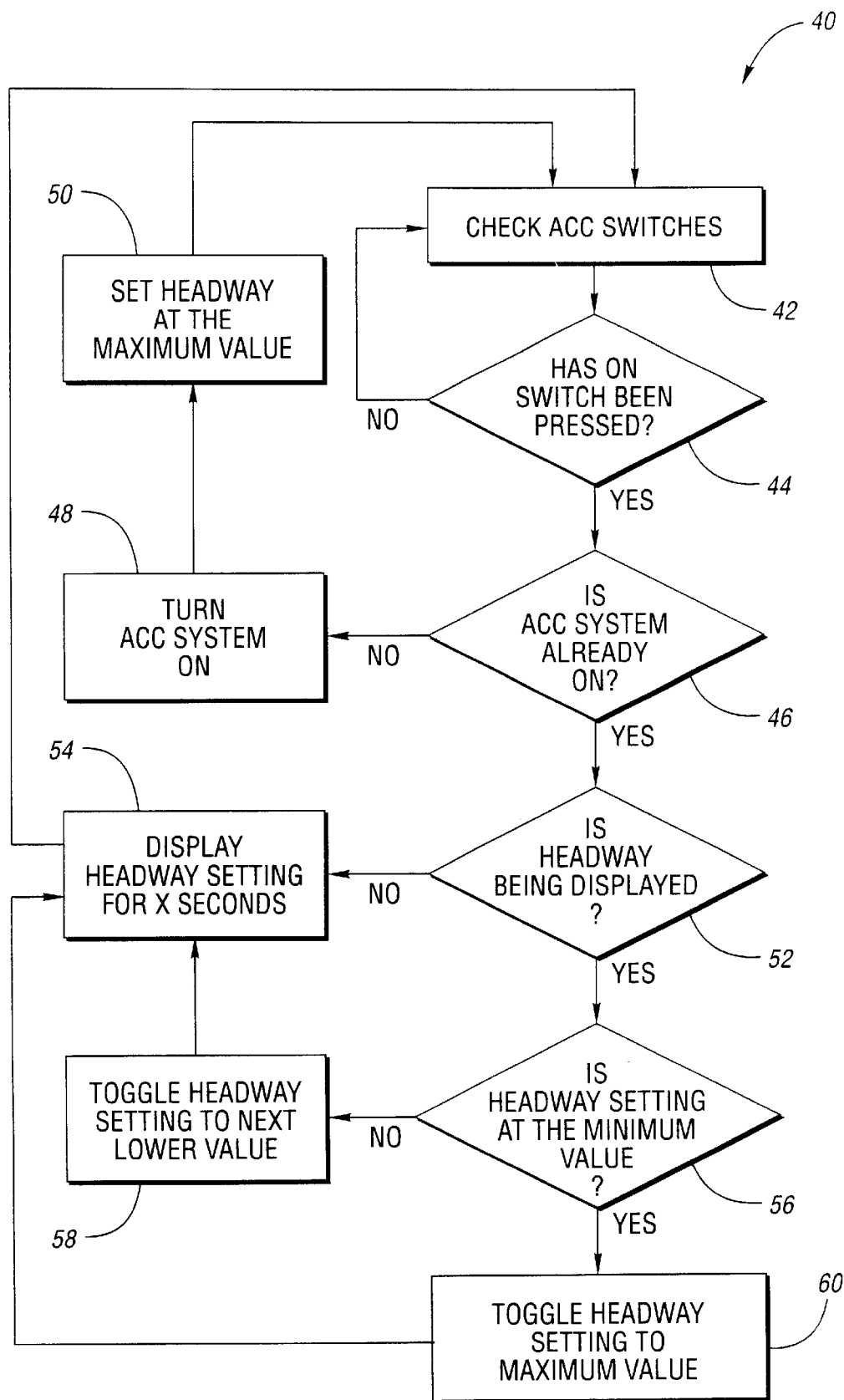
FIG. 2 is a flowchart including the method of the present invention.

Referring to FIGS. 1 and 2, the preferred embodiment of the method and system of the present invention will now be described. In that regard, FIG. 1 illustrates a simplified block diagram of an Adaptive Cruise Control (ACC) system, including the system of the present invention, denoted generally by reference numeral 10.

In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 1, the ACC system (10) includes a vehicle controller (12) provided in communication with a range sensor (14), a speed sensor (16), a yaw rate sensor (18), a user interface (20), a throttle actuator (22), and a brake actuator (24). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target (i.e., a lead vehicle) in the forward path of travel of the ACC equipped vehicle.

The following interval between the ACC equipped vehicle and the sensed target is initially set at a default value (typically two seconds) upon activation of the system (10), but may be modified by the vehicle operator to a number of other selectable values (typically a value greater than or equal to one second, but less than or equal to two seconds) via user interface (20). The default following interval is typically the maximum following interval allowed, and modification of the following interval by the vehicle operator is permitted between that maximum and a defined minimum following interval (typically one second). The following interval is referred to as headway, and is defined as the range to the sensed target (in meters), divided by the speed of the ACC equipped vehicle (in meters per second). User interface (20) is also used by the vehicle operator to set the desired vehicle control speed. In that regard, user interface (20) includes a switch (not shown) which may be actuated by the vehicle operator to activate the ACC system (10) (i.e., an "on/off" switch), as well as a switch (not shown) which may be actuated by the vehicle operator to adjust a headway setting. User interface (20) also includes an indicator (not shown) for indicating to the vehicle operator whether the ACC system (10) is active and, if so, the currently selected headway setting. The indicator is typically visual, and generally takes the form of a lamp and/or an LED in the vehicle instrument panel for displaying the information described above to the vehicle operator, although any number of other types of indicators are possible.

As previously noted, ACC systems and methods are well known in the art. As a result, a detailed description of the general operation of ACC system (10), including such functions as acquisition, discrimination, differentiation, selection and tracking of targets, range and relative velocity (range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

As also previously noted, existing ACC methods and systems must provide the vehicle operator with not only the ability to activate the vehicle ACC system, but to select a headway setting as well. To do so, however, existing ACC methods and systems employ two vehicle operator switches, one for activating the ACC system and another for adjusting the headway setting. Moreover, in a vehicle equipped with a standard speed control systems, when an ACC system is added to the vehicle, an additional vehicle operator switch must be provided for adjusting the headway setting.

In contrast to the prior art, the present invention provides, in the ACC system (10) of FIG. 1, a method and system for providing a headway function to the existing ACC system activation switch. Such a method and system determine whether the adaptive speed control activation switch has been actuated, and, if so, determine whether the adaptive speed control system is already active. If the adaptive speed control system is active, such a method and system then control a headway function of the adaptive speed control system in response to the prior actuation of the adaptive speed control activation switch. Such control includes adjusting the headway setting of the adaptive speed control system. By providing an adaptive speed control activation switch with such dual capability, the method and system of the present invention eliminate the need for two separate vehicle operator switches (one for ACC activation and another for adjusting the ACC headway setting), thereby reducing cost.

Referring again to FIG. 1, the system of the present invention is preferably included in vehicle controller (12). In that regard, vehicle controller (12) includes a receiver (not shown) capable of receiving an input signal indicative of the actuation of the activation switch of the adaptive speed control system. Vehicle controller (12) also includes a controller (not shown) capable of determining whether the adaptive speed control system is active if the adaptive speed control activation switch has been actuated. If the adaptive speed control system is not active, the controller is capable of generating a control signal operative to activate the adaptive speed control system. Alternatively, if the adaptive speed control system is active, the controller of the system of the present invention is capable of controlling a headway function of the adaptive speed control system in response to the actuation of the activation switch. It should be noted here that the controller (as well as vehicle controller (12) of ACC system (10)) may take the form of an appropriately programmed microprocessor, or any equivalent thereof.

To control a headway function in response to the actuation of the activation switch, the controller is capable of determining whether a headway setting is displayed to the vehicle operator via user interface (20) of the adaptive speed control system. If such a headway setting is not displayed, the controller is capable of generating a control signal operative to display a headway setting to the vehicle operator for a selected time period via user interface (20).

To control a headway function in response to actuation of the activation switch, the controller is also capable of determining whether a headway setting equals a predetermined minimum value (typically one second as described above). If the headway setting equals the predetermined minimum value, the controller is capable of setting the headway setting equal to a predetermined maximum value (typically two seconds as described above). If the headway setting does not equal the predetermined minimum value, the controller is capable of setting the headway setting to one of a plurality of predetermined values less than the predetermined maximum value (i.e., setting the headway setting to one of a number of values less than two seconds). In either case, the controller is further capable of generating a control signal operative to display the headway setting to the vehicle operator via user interface (20).

Referring now to FIG. 2, a flowchart of the method of the present invention is shown, denoted generally by reference numeral 40. As seen therein, according to the method (40) of the present invention, a check (42) of the ACC system switches is undertaken, and it is determined (44) whether the adaptive speed control activation (i.e., "on/off") switch has been pressed. If not, the check (42) of the ACC system switches is again undertaken.

Alternatively, if the adaptive speed control activation switch has been actuated, according to the method of the present invention, it is determined (46) whether the adaptive speed control system is already active. If not, the adaptive speed control system is activated (48), and the headway is set (50) at the default maximum predetermined value (typically two seconds). Subsequently, the check (42) of the ACC system switches is again undertaken.

However, if the adaptive speed control system is already active, it is then determined (52) whether a headway setting is being displayed to the vehicle operator by the adaptive speed control system. If not, the currently selected headway setting (i.e., the default maximum predetermined value) is displayed (54) for a selected time period (i.e., "x" seconds) to the vehicle operator. Thereafter, the check (42) of the ACC system switches is undertaken again.

Alternatively, however, if a headway setting is being displayed to the vehicle operator, it is then determined (56) whether the currently selected headway setting equals a predetermined minimum value (typically one second). If not, the currently selected headway setting is set equal to one of a plurality of predetermined values less than the predetermined maximum value (i.e., one of a number of values less than two seconds). Preferably, the currently selected heating setting is set equal to the next lower value (58). Thereafter, the newly selected headway setting is displayed (54) to the vehicle operator for a selected time period, and the check (42) of the ACC system switches is undertaken again.

If, however, the currently selected headway setting equals the predetermined minimum value, then the currently selected headway setting is set equal to a predetermined maximum value (60), and the check (42) of the ACC system switches is again undertaken. In such a fashion, with respect to the setting of the headway value, the headway is initially set at the default maximum value. Thereafter, each actuation of the adaptive speed control activation switch toggles the headway setting to the next available lower value, ultimately down to the predetermined minimum value. At that point, the next actuation of the adaptive speed control activation switch toggles the headway setting back to the maximum value, and the process repeats. Each headway setting selected is also displayed to the vehicle operator.

From the foregoing description, it can be seen that the present invention provides, in an ACC system, a method and system for providing a headway function to the existing ACC system activation switch. The method and system determine whether the adaptive speed control activation switch has been actuated, and, if so, determine whether the adaptive speed control system is already active. If the adaptive speed control system is active, the method and system then control a headway function of the adaptive speed control system in response to the prior actuation of the adaptive speed control activation switch. Such control includes adjusting the headway setting of the adaptive speed control system. By providing an adaptive speed control activation switch with such dual capability, the method and system of the present invention eliminate the need for two separate vehicle operator switches (one for ACC activation and another for adjusting the ACC headway setting), thereby reducing cost.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for providing a headway control feature to an adaptive speed control activation switch, the method comprising:

determining whether the adaptive speed control activation switch has been actuated;

if the adaptive speed control activation switch has been actuated, determining whether the adaptive speed control system is active; and if the adaptive speed control system is active, controlling a headway function of the adaptive speed control system in response to the actuation of the adaptive speed control activation switch, wherein controlling the headway function comprises determining whether a headway setting is displayed by the adaptive speed control system, and, if the headway setting is not displayed, displaying the headway setting for a selected time period.

2. The method of claim 1 wherein controlling the headway function comprises:

determining whether a headway setting equals a predetermined minimum value; and if the headway setting equals the predetermined minimum value, setting the headway setting equal to a predetermined maximum value.

3. The method of claim 2 wherein controlling the headway function further comprises displaying the headway setting equal to the predetermined maximum value.

4. The method of claim 2 wherein controlling the headway function further comprises setting the headway setting to one of a plurality of predetermined values less than the predetermined maximum value if the headway setting does not equal the predetermined minimum value.

5. The method of claim 4 wherein controlling the headway function further comprises displaying the headway setting equal to the one of a plurality of predetermined values.

6. In an adaptive speed control system for a vehicle, a system for providing a headway control feature to an adaptive speed control activation switch, the system comprising:

a receiver for receiving an input signal indicative of actuation of the adaptive speed control activation switch; and a controller for determining whether the adaptive speed control system is active if the adaptive speed control activation switch has been actuated, and controlling a headway function of the adaptive speed control system in response to the actuation of the adaptive speed control activation switch if the adaptive speed control system is active, wherein controlling the headway function comprises determining whether a headway setting is displayed by the adaptive speed control system, and generating a control signal operative to display the headway setting for a selected time period if the headway setting is not displayed.

7. The system of claim 6 wherein, to control the headway function, the controller is also for determining whether a headway setting equals a predetermined minimum value, and setting the headway setting equal to a predetermined maximum value if the headway setting equals the predetermined minimum value.

8. The system of claim 7 wherein, to control the headway function, the controller is further for generating a control signal operative to display the headway setting equal to the predetermined maximum value.

9. The system of claim 7 wherein, to control the headway function, the controller is further for setting the headway setting to one of a plurality of predetermined values less than the predetermined maximum value if the headway setting does not equal the predetermined minimum value.

10. The system of claim 9 wherein, to control the headway function, the controller is further for generating a control signal operative to display the headway setting equal to the one of a plurality of predetermined values.

* * * * *